United States Patent Office 3,325,141
Patented June 13, 1967

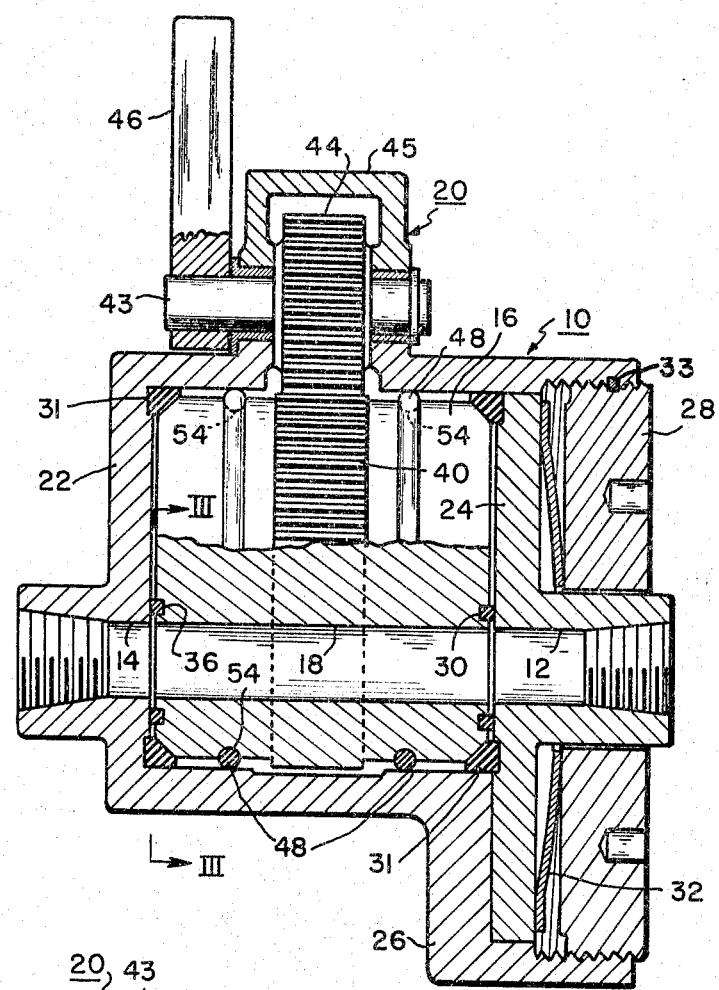
Fig.1
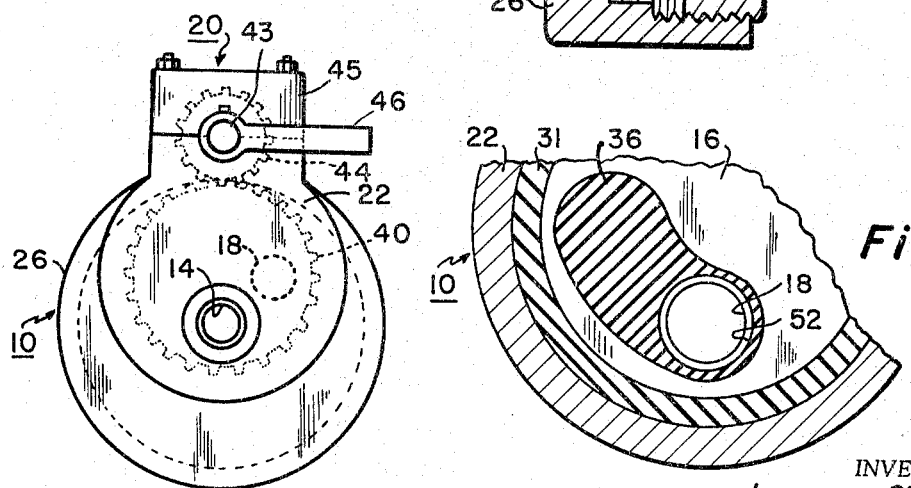
Fig.2
Fig.3
INVENTOR.
Lawrence Skendrovic
BY
Webb, Burden, Robinson & Webb
HIS ATTORNEYS

3,325,141
FULL FLOW VALVE
Lawrence Skendrovic, 402 Glencoe Drive, Borough of West Mifflin, Allegheny County, Pa. 15122
Filed Sept. 24, 1964, Ser. No. 399,029
4 Claims. (Cl. 251—302)

This invention relates to an improvement in valves and relates in particular to a new and novel full-flow valve.

Conventional full-flow valves are commonly of complex construction and/or are difficult to install, repair and maintain.

I have devised a full-flow valve for use in controlling the flow of liquids through conduits that is of simple construction, yet is particularly easy to install, remove, repair and maintain. My valve may be employed to effectively shut off the flow of liquid without leakage and may be opened to permit completely uninhibited flow of liquid between the conduits to which it is attached.

I have shown the present preferred embodiment of my invention in the accompanying drawings in which:

FIGURE 1 is a side view partially in cross section of a valve that embodies the features of the present invention, shown in the open position;

FIGURE 2 is an end elevation view of the valve of FIGURE 1, shown in the closed position; and FIGURE 3 is a fragmentary enlarged end view of a segment of the valve of FIGURE 1 as seen along the line III—III thereof.

Referring to the drawings, the present valve comprises a valve housing 10 having opposing axially aligned ports 12 and 14, a rotatable cylinder 16 within housing 10 that has an eccentric longitudinal pasageway 18 for rotation into or out of simultaneous communication with the ports 12 and 14 and gear means 20 for rotating the cylinder 16.

Housing 10 is composed of a generally cup-shaped section 22 that is substantially enclosed at one end, except for the port 14, and is substantially open at the other end. A disk or plate-shaped section 24 of housing 10 seats within an enlarged diameter, cylindrically extended portion 26 of section 22 and forms the opposite side of the housing. Cup-shaped section 22 and plate-shaped section 24 enclose within them a chamber.

Port 12 opens axially through disk section 24 while port 14 opens eccentrically through the enclosed end of section 22. The enlarged diameter cylindrically extended portion 26 of section 22 receives disk section 24 so that ports 12 and 14 are substantially axially aligned.

Disk section 24 is retained within the open end or extended portion 26 of section 22 by a threaded gland nut 28 that is threadedly engaged with the threaded inside surfaces of extended portion 26 of section 22. Disk section 24 is urged against seals 30 and 31 by a spring 32 that is compressed between the gland nut 28 and disk section 24.

Annular seals 31, positioned in annular grooves within housing 10, are compressed by plate 24 (through spring 32) against cylinder 16 to effect a seal between cylinder 16 and the housing 10. These seals slide on the surface of cylinder 16 when this member is rotated.

Seals 30 and 36 are also compressed between the housing 10 and cylinder 16 by spring 32 and effect liquid-tight seals between ports 12 and 14 and passageway 18 when the cylinder is rotated to a position wherein the eccentric passageway 18 is in simultaneous communication with the ports (FIGURE 1). The tension of spring 32 may be adjusted by rotation of gland nut 28. A nylon thread lock 33 locks gland nut 28 to prevent its rotation.

In FIGURE 3, the preferred seal 36 is shown to be substantially oblong in shape (kidney shaped) and is provided with an opening 52. Seal 36 seats within a groove in cylinder 16 so that passageway 18 opens through the opening 52. When cylinder 16 is rotated to a position wherein passageway 18 communicates with port 14 (FIGURE 1), seal 36 prevents fluid flowing from port 14 into passageway 18 (or vice versa) from penetrating to between the valve housing 10 and cylinder 16. When cylinder 16 is rotated so that passageway 18 is out of communication with port 14 (FIGURE 2), port 14 is sealed from fluid leakage to between the valve housing 10 in cylinder 16 by the solid portion of seal 36. Seal 36 is, of course, preferably constructed and seated in the same manner as seal 30 so as to prevent any leakage from port 12 to between cylinder 16 and housing 10.

Annular sealing rings 48 positioned in circumferential grooves 54 in the surface of cylinder 16 seal the cylinder to the housing 10 and prevent communication between the gear means 20 and other parts of the valve.

Gear means 20 is composed of a spur gear 44 that is rigidly mounted to a shaft 43 that spans an extended portion 45 of housing 10. Rotation of a lever 46 that is rigidly affixed to the shaft 43 causes the spur gear to rotate. The teeth of the spur gear 44 are meshed with gear teeth 40 in the circumferential surface of cylinder 16 so that when lever 46 and spur gear 44 are caused to rotate, cylinder 16 rotates and eccentric passageway 18 moves either into or out of communication with ports 12 and 14.

My sealing materials such as those employed in gaskets or seals 36, 30, 31 and sealing rings 48 are preferably made of a resilient material that will withstand extended use in the presence of the liquid involved. I prefer to employ such materials as Teflon which has proved to be an excellent sealer and which possesses particularly desirable erosion and corrosion resistance properties.

Ports 12 and 14 are threaded so that the valve may be threadedly engaged to conduits or pipe.

A particularly desirable feature of the present apparatus is in its ease of installation and repair. Gland nut 28 may be removed over the conduit or pipe connection and plate or disk 24 may be rotatably disconnected from a threaded conduit or pipe to provide easy access to cylinder 16.

While I have described the presently preferred embodiments of my invention, it is to be understood that it may be otherwise embodied within the scope of the following claims.

I claim:
1. A full flow valve comprising:
   (A) a housing formed with a chamber having opposite sides and a port formed through each of said sides;
   (B) a piston shaped plug rotatably mounted within said chamber with its ends adjacent said sides of the chamber to provide a pair of facing surfaces at each end of the plug and formed with a passageway having openings through opposite flat ends of said plug, said openings being spaced from the axis of said plug, positioned to communicate substantially simultaneously with said two ports when said plug is rotated to a first position so as to permit the free flow of liquid between said ports through said passageway, and to communicate with neither of said ports when said plug is rotated to at least one second position so as to shut off and prohibit the flow of liquid between said ports;
   (C) a flat, oblong gasket at each end of the plug and encompassing said respective openings, each of said gaskets being positioned in a complementary recess formed in one of the facing surfaces of each pair of facing surfaces, said recesses being of lesser depth than the gauge of said gaskets and said gaskets being provided with perforations in communication with said openings and positioned so that when said plug is rotated to a second position, a solid area of said respective gaskets closes the space between the ports and the openings and prevents communication therebetween, said gaskets being disposed to bear on one of the facing surfaces at each end of the plug and seal said ports and passageway from liquid penetration between said plug and housing when said plug is in said first position and seal said ports from such liquid penetration when said plug is in said second position; and (D) means for rotating said plug.

2. A full flow valve as set forth in claim 1 wherein said passageway is eccentric and substantially parallel to the axis of said plug and said ports are substantially axially aligned.

3. A full flow valve as set forth in claim 1 wherein said housing is composed of first and second parts, said first part consisting of a cup-shaped member open at one end and closed at the other end except for one of said ports, said one port being eccentrically positioned in respect to the central axis of said cup-shaped part, said second part being composed of a plate-shaped member disposed to slide within the open end of said cup-shaped part to enclose said plug as rotatably positioned within said housing, the other of said two ports being substantially axially positioned in said second part and said cup-shaped part being provided with an eccentrically extended open end disposed to receive said plate part so that said ports are substantially axially aligned, annular gaskets positioned within said housing at either end of said plug so that said plug bears on said gaskets during rotation and means for urging said second plate part of said housing against said gaskets so as to compress said gaskets between said plug and said housing.

4. A valve comprising:
(A) a hollow cylindrical housing closed at one end;
(B) a cylindrical plug rotatably mounted within said housing and extending the length of the housing;
(C) a plate closing the other end of said housing;
(D) an opening in the closed end and an opening in said plate aligned with each other;
(E) means on said closed end and on said plate for securing a conduit to each end of the valve in line with said opening;
(F) a passageway having openings in the end of said plug which will move into and out of alignment with the openings in the closed end of the housing and in the closing plate upon rotation of the plug about its longitudinal axis within the housing;
(G) means for rotating said plug within said housing;
(H) an annular seal between an end of the plug and the closed end of the housing and between the other end of the plug and the closing plate; and
(I) means for moving the closing plate in a direction parallel to the central axis of the plug toward the opposite end of the housing to compress said seals against the plug ends and the end of the housing and against the closing plate.

References Cited

UNITED STATES PATENTS

| 2,913,220 | 11/1959 | Cover | 251—327 |
| 3,232,578 | 2/1966 | Cousins | 251—302 |

FOREIGN PATENTS

| 1,335,039 | 7/1963 | France. |

M. CARY NELSON, *Primary Examiner.*

R. C. MILLER, *Assistant Examiner.*